April 6, 1954     K. E. DAHL ET AL     2,674,643
BATTERY THERMOSTAT
Filed Dec. 6, 1952
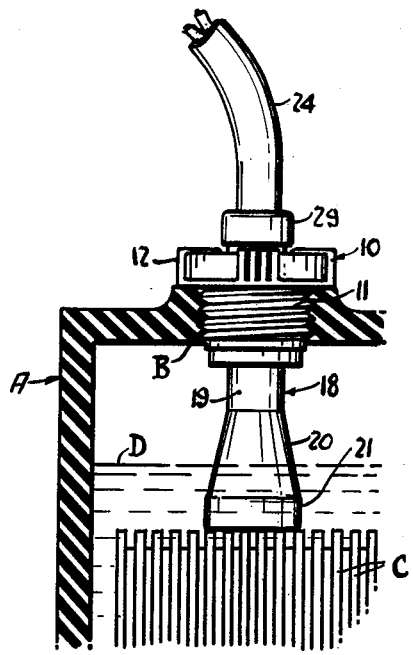
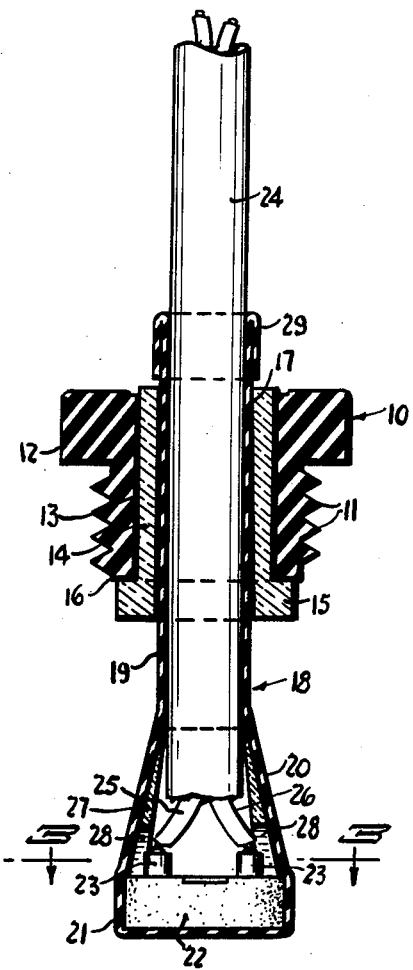
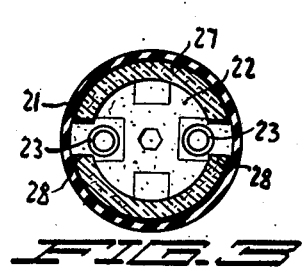
INVENTORS
KARL F. DAHL
JAMES C. HOIBY
BY Carlsen + Hoyle
ATTORNEYS Patented Apr. 6, 1954

2,674,643

UNITED STATES PATENT OFFICE 2,674,643

BATTERY THERMOSTAT

Karl E. Dahl and James C. Hoiby, Minneapolis, Minn., assignors to D. W. Onan and Sons, Inc., Minneapolis, Minn., a corporation of Minnesota Application December 6, 1952, Serial No. 324,450

5 Claims. (Cl. 136—182)

This invention relates to improvements in storage battery thermostats for sensing temperature changes in the battery electrolyte.

We are concerned primarily in the heating of storage batteries for extreme cold weather operations. It is necessary in certain fields to operate engine driven equipment at temperatures ranging downward to minus 65° F. and it becomes necessary to heat the starting battery in order to obtain normal output capacity from it under these conditions. Heat may be applied to the battery in various ways, but it is also necessary to keep the battery electrolyte from being overheated. It is the primary object of our invention, therefore, to provide a thermostat which may be utilized to control the heating of the battery and which controls the applied heat according to changes in the temperature of the battery electrolyte itself.

Another object is to provide a thermostat associated with a cap for the usual filler opening of the battery and which is arranged to completely submerge the thermostat element per se in the electrolyte so that ambient temperatures outside of the battery and above the electrolyte level will have little or no effect on the calibration. The conductor leads, and a rubber or other suitable sheath for protecting the element from the electrolyte, are the only connection between the thermostat and cap.

A further object is to provide a storage battery thermostat assembly in which the distance between the battery cap and the thermostat element may be readily adjusted for different batteries in which the distance between the top of the battery cell and upper edges of the plates may vary, so that the thermostat may in all cases be properly submerged in the electrolyte.

Still another object is to provide a storage battery thermostat using a wafer-like thermostat element to facilitate complete submersion in the electrolyte and which element is preferably of the snap action variety for positive control of the heat source.

These and other more detailed and specific objects will be disclosed in the course of the following specification, reference being had to the accompanying drawings, in which—

Fig. 1 is a vertical sectional view through the upper part of a storage battery cell showing a thermostat assembly according to our invention properly installed in the cell, submerged in the electrolyte and with the thermostat element itself located immediately above the battery plates.

Fig. 2 is an enlarged diametrical sectional view through the thermostat assembly, removed from the battery.

Fig. 3 is a horizontal sectional view, taken substantially along the line 3—3 in Fig. 2.

Fig. 4 is a perspective view of the stiffener cone forming part of the assembly.

Referring now more particularly and by reference characters to the drawing, we have shown our invention in association with a storage battery cell A having the usual tapped filler opening B in its top, and in Fig. 1 there is partially shown a group of battery plates C with the electrolyte level at D well above the upper edges of the plates.

The battery thermostat assembly according to our invention includes a battery cap 10 having the usual threads 11 to fit the filler opening B and an enlarged knurled head 12. For our purpose this cap 10 is provided with a vertical opening 13 and located in this opening is a sleeve 14 having a diametrically enlarged flange 15 at its lower end which fits up against the lower end 16 of the cap as shown. The cap 10 is, as usual, made of hard rubber or analogous material, while the sleeve 14 may well be made of fiber, or the like. The sleeve has a central axial bore 17 which slightly tapers in an upward direction. This bore receives a soft rubber sheath, designated generally at 18, having an elongated tubular neck 19 and a downwardly flaring lower end 20 terminating in a closed lower end in the form of a circular pocket 21 the diameter of which is such that it will just nicely pass down into the battery cell, through the filler opening B.

A wafer-like, or disc-shaped, thermostat 22 of a commercially available type is utilized, the same having spaced terminals 23, and this element is positioned in the sheath pocket 21 with the terminals turned upward. Connection to the thermostat is made through a dual conductor lead 24, of the usual rubber encased flexible variety, which extends down through the neck 19 of the sheath and has its exposed conductors 25—26 soldered to the terminals 23. Located in the flared end 20 above the element 22 is a stiffener cone 27, also of fiber or the like, protecting the conductors where they diverge and are soldered to the terminals, said cone being hollow and of a wall thickness which tapers upwardly as seen. The heavy lower edge of the cone has notches 28 at diametrically opposed points to clear the terminals 23. The stiffener cone obviously overcomes a tendency to limpness at the neck 19 of the sheath and protects the conductors 25—26.

It will be readily evident that the assembly thus made will permit the thermostat to be lowered through the filler opening B and then held in place by screwing the cap 10 in that opening, the cap turning on the sleeve to facilitate this operation. The sheath will, of course, protect the thermostat and its lead wires from the electrolyte and the neck 19 of the sheath, when filled with the lead 24, fits tightly in the tapered bore 17 of the sleeve 14 but be adjusted upward or downward therethrough so that the thermostat element 22 is completely submerged below the level D of the electrolyte, down on or very close to the upper edges of the plates C. Thus only the sheath and lead extend between cap and thermostat and the latter will be directly responsive to changes in electrolyte temperatures and is influenced but little if any by temperatures of the air about the unit and the battery. The adjustment afforded by the tight slip fit between the sheath and the sleeve 14 permits the positioning of the thermostat element at its proper submerged location regardless of the distance between the top of the cell and the battery plates. The taper of the bore 17 particularly resists upward displacement of the thermostat, once it is adjusted, and downward displacement is prevented by rolling or folding down the upper end of the sheath, as shown at 29, to engage the upper end of the sleeve. Of course, the lead 24 is of any length necessary to make connection to the circuit or device controlling the battery heating.

In addition to the heating of batteries for cold weather use there is a field for a thermostat of the type here provided in the so-called fast charging of storage batteries. It is necessary in this field also to prevent overheating of the electrolyte and the present thermostat will obviously function well for this purpose also, controlling the charging circuit according to the electrolyte temperature.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a battery thermostat of the character described and for use in connection with a battery having a filler opening and a level of electrolyte below the opening, the combination comprising a cap for the filler opening, a soft rubber sheath mounted down through the cap and having a closed lower end, a conductor lead extending down through said sheath, and a thermostat in the lower end of the sheath connected to said lead and supported by the sheath in a submerged position beneath the electrolyte level, the said sheath being slidable up and down through the cap so that the distance between the thermostat and cap may be varied.

2. A battery thermostat for installation in the tapped filler opening of a storage battery cell having electrolyte at a level below said opening, comprising in combination, a battery cap threaded to fit said filler opening and having a bore from top to bottom, a tubular sleeve rotatably mounted in said bore, a sheath of soft rubber or analogous material having a neck extending down through said sleeve and having an enlarged circular pocket at its lower end of a diameter such as to pass downward through the filler opening, a wafer-like thermostat element positioned in said pocket, a conductor lead extending down through the neck of the sheath and connected to the thermostat element, and the sheath being slidable up and down through the sleeve to locate the thermostat element in a submerged position below the electrolyte level.

3. A battery thermostat for installation in the tapped filler opening of a storage battery cell having electrolyte at a level below said opening, comprising in combination, a battery cap threaded to fit said filler opening and having a bore from top to bottom, a tubular sleeve rotatably mounted in said bore, a sheath of soft rubber or analogous material having a neck extending down through said sleeve and having an enlarged circular pocket at its lower end of a diameter such as to pass downward through the filler opening, a wafer-like thermostat element positioned in said pocket, a conductor lead extending down through the neck of the sheath and connected to the thermostat element, the sheath being slidable up and down through the sleeve to locate the thermostat element in a submerged position below the electrolyte level, the said sleeve having a bore tapered in an upward direction to tightly engage the neck of the sheath and hold the same against upward displacement and the sleeve having also a flange at its lower end to engage the cap and prevent upward displacement.

4. A battery thermostat for installation in the tapped filler opening of a storage battery cell having electrolyte at a level below said opening, comprising in combination, a battery cap threaded to fit said filler opening and having a bore from top to bottom, a tubular sleeve rotatably mounted in said bore, a sheath of soft rubber or analogous material having a neck extending down through said sleeve and having an enlarged circular pocket at its lower end of a diameter such as to pass downward through the filler opening, a wafer-like thermostat element positioned in said pocket, a conductor lead extending down through the neck of the sheath and connected to the thermostat element, the sheath being slidable up and down through the sleeve to locate the thermostat element in a submerged position below the electrolyte level, the said sleeve having a bore tapered in an upward direction to tightly engage the neck of the sheath and hold the same against upward displacement and the sleeve having also a flange at its lower end to engage the cap and prevent upward displacement, and the neck of the sheath extending above the cap and having its upper edge folded downward.

5. A battery thermostat for installation in the tapped filler opening of a storage battery cell having electrolyte at a level below said opening, comprising in combination, a battery cap threaded to fit said filler opening and having a bore from top to bottom, a tubular sleeve rotatably mounted in said bore, a sheath of soft rubber or analogous material having a neck extending down through said sleeve and having an enlarged circular pocket at its lower end of a diameter such as to pass downward through the filler opening, a wafer-like thermostat element positioned in said pocket, a conductor lead extending down through the neck of the sheath and connected to the thermostat element, the sheath being slidable up and down through the sleeve to locate the thermostat element in a submerged position below the electrolyte level, and a hollow stiffener cone located in the sheath above the pocket and stiffening the sheath between the lower end of the conductor lead and the thermostat element.

References Cited in the file of this patent

UNITED STATES PATENTS

| Number | Name | Date |
|---|---|---|
| Re. 22,883 | Heyer | May 27, 1947 |
| 1,779,946 | Nelson | Oct. 28, 1930 |
| 2,514,881 | Leupold | July 11, 1950 |
| 2,563,234 | Godshalk et al. | Aug. 7, 1951 |